United States Patent
Kambouris

(10) Patent No.: US 12,256,768 B2
(45) Date of Patent: Mar. 25, 2025

(54) SYSTEMS AND METHODS FOR THE PREPARATION OF PLANT DERIVED PRODUCTS USING OSMOSIS TECHNIQUES

(71) Applicant: Botanical Water Technologies IP Ltd, London (GB)

(72) Inventor: Ambrosios Kambouris, Mildura (AU)

(73) Assignee: Botanical Water Technologies IP Ltd, London (GB)

( * ) Notice: Subject to any disclaimer, the term of this patent is extended or adjusted under 35 U.S.C. 154(b) by 0 days.

(21) Appl. No.: 18/736,083

(22) Filed: Jun. 6, 2024

(65) Prior Publication Data
US 2024/0315290 A1    Sep. 26, 2024

Related U.S. Application Data

(63) Continuation of application No. 16/971,515, filed as application No. PCT/AU2019/050138 on Feb. 20, 2019, now abandoned.

(30) Foreign Application Priority Data

Feb. 22, 2018 (AU) ................... 2018900561
Jun. 15, 2018 (AU) ................... 2018902142

(51) Int. Cl.
    *A23L 2/08*     (2006.01)
    *A23K 10/38*     (2016.01)
    (Continued)

(52) U.S. Cl.
    CPC ................ *A23L 5/51* (2016.08); *A23K 10/38* (2016.05); *A23L 2/085* (2013.01); *B01D 61/002* (2013.01);
    (Continued)

(58) Field of Classification Search
CPC ..... B01D 61/002; B01D 61/364; C02F 1/445; C05F 5/00
See application file for complete search history.

(56) References Cited

U.S. PATENT DOCUMENTS

2013/0112603 A1    5/2013    Koo et al.
2014/0151294 A1    6/2014    Prior et al.

FOREIGN PATENT DOCUMENTS

CN      103182246 A    7/2013
EP      3130398 A1    2/2017
(Continued)

OTHER PUBLICATIONS

Madhumala, M. et al., 'Forward-osmosis-aided concentration of fructose sugar through hydrophilized polyamide membrane: Molecular modeling and economic estimation.' Journal of Applied Polymer Science 134.13(2017): pp. 1-12.

(Continued)

*Primary Examiner* — Bradley R Spies
(74) *Attorney, Agent, or Firm* — Sand, Sebolt & Wernow Co., LPA

(57) ABSTRACT

A method for preparing a plant derived product or a process intermediate or a process input, the method comprising the steps of providing a plant derived starting material, subjecting the starting material to a forward osmosis step against a draw solution so as to produce a plant material concentrate, and subjecting the draw solution to a water removal step. The water removal step may include further forward osmosis in combination with an evaporator system.

10 Claims, 2 Drawing Sheets

(51) Int. Cl.
| | |
|---|---|
| A23L 5/00 | (2016.01) |
| B01D 61/00 | (2006.01) |
| B01D 61/02 | (2006.01) |
| B01D 61/36 | (2006.01) |
| C02F 1/44 | (2023.01) |
| C05F 5/00 | (2006.01) |

(52) U.S. Cl.
CPC ....... *B01D 61/0022* (2022.08); *B01D 61/025* (2013.01); *B01D 61/364* (2013.01); *C02F 1/441* (2013.01); *C02F 1/445* (2013.01); *C05F 5/00* (2013.01)

(56) References Cited

FOREIGN PATENT DOCUMENTS

| | | |
|---|---|---|
| JP | 3052788 U | 10/1998 |
| JP | 3995704 B1 | 8/2007 |
| JP | 4113568 B1 | 4/2008 |
| JP | 2011255312 A | 12/2011 |
| JP | 2018001150 A | 1/2018 |
| WO | 2012106732 A2 | 8/2012 |
| WO | 2014082007 A2 | 5/2014 |
| WO | 2015136554 A1 | 9/2015 |
| WO | 2017040696 A1 | 3/2017 |
| WO | 2017078644 A2 | 5/2017 |

OTHER PUBLICATIONS

Intense natural food flavors Vibrant natural food colors, Ederna, [retrieved from internet on Mar. 28, 2019]. <URL:http://ederna.com/beverages> published on Jan. 30, 2018 as per Wayback Machine. [1].

Evapeos®: The Green Future of Instant Coffee, Ianniciello, L. et al dated 2014[retrieved from internet on Apr. 1, 2019]. <URL:http://www.ederna.com/Fichiers/pages/125824applicationnote_ederna_instantcoffee_r.pdf> published on Feb. 9, 2015 as per Wayback Machine. [.

Viladomat, F.G. et al. 'Engineered Osmosis: New approach for sensitive liquid foods concentration' 2017 International Nonthermal Processing Conference and Short Course Abstract Booklet, May 24-25, 2017 Chicago Illanois., p. 103. [retrieved from internet on Apr. 1, 2019]. <URL:https://www.ifsh.iit.edu/sites/ifsh/files/departments/2017Nonthermal%20Abstract%20Book.pdf >.

Garcia-Castello, E.M. et al., 'Performance evaluation of sucrose concentration using forward osmosis' Journal of Membrane Science, 2009, vol. 338, pp. 61-66.

Singh, N. et al., 'Concentrating molasses distillery wastewater using biometric forward osmosis (FO) membranes', Water Research, 2018 (available online Dec. 2017), vol. 130, pp. 271-280.

Liu, et al., 'A low-energy forward osmosis process to produce drinking water', Energy & Environmental Science, 4, (2011), pp. 2582-2585 (Year: 2011).

Garcia-Castello, et al., 'Dewatering press liquor derived from orange production by forward osmosis', Journal of Membrane Science, 371, (2011 ), pp. 97-101. (Year: 2011).

International Search Report PCT Application No. PCT/AU2019/050138 published: Aug. 29, 2019 (Aug. 29, 2019), retrieved from the Internet Jun. 7, 2024 (Jun. 7, 2024).

Written Opinion of the International Search Authority PCT Application No. PCT/AU2019/050138 published: Aug. 29, 2019 (Aug. 29, 2019), retrieved from the Internet Jun. 11, 2024 (Jun. 11, 2024).

International Preliminary Report on Patentability Chapter 1 PCT Application No. PCT/AU2019/050138 published: Sep. 3, 2020 (Sep. 3, 2020), retrieved from the Internet Jun. 7, 2024 (Jun. 7, 2024).

Australian Examination Report No. 1 AU Application No. 2019225447 published: Jul. 29, 2022 (Jul. 29, 2022), retrieved from the Internet Jun. 7, 2024 (Jun. 7, 2024).

Australian Examination Report No. 2 AU Application No. 2019225447 published: Aug. 26, 2022 (Aug. 26, 2022), retrieved from the Internet Jun. 7, 2024 (Jun. 7, 2024).

Australian Examination Report No. 3 AU Application No. 2019225447 published: Nov. 8, 2022 (Nov. 8, 2022), retrieved from the Internet Jun. 7, 2024 (Jun. 7, 2024).

Australian Examination Report No. 4 AU Application No. 2019225447 published: Dec. 20, 2022 (Dec. 20, 2022), retrieved from the Internet Jun. 7, 2024 (Jun. 7, 2024).

Australian Notice of Acceptance AU Application No. 2019225447 published: Jan. 10, 2023 (Jan. 10, 2023), retrieved from the Internet Jun. 7, 2024 (Jun. 7, 2024).

Australian Notice to Grant AU Application No. 2019225447 published: May 4, 2023 (May 4, 2023), retrieved from the Internet Jun. 7, 2024 (Jun. 7, 2024).

SYSTEMS AND METHODS FOR THE PREPARATION OF PLANT DERIVED PRODUCTS USING OSMOSIS TECHNIQUES

REFERENCE TO RELATED APPLICATIONS

This application is a Continuation of U.S. patent application Ser. No. 16/971,515 filed Aug. 20, 2020, which is a national phase entry of PCT/AU2019/050138 having an International Filing Date of Feb. 20, 2019, which International Application claims priority from AU2018902142 filed Jun. 15, 2018 and AU2018900561 filed Feb. 22, 2018; the entire specifications of which are incorporated herein by reference.

TECHNICAL FIELD

The present invention relates to the industrial level production of products derived from plant material, and in particular fruit, cane and vegetable material. The system and methods may be used to produce end-products such as beverages and fertilizers, or process inputs such as process water. In particular the present invention relates to a process and apparatus for concentrating liquid solutions containing dissolved solids to very low water content.

BACKGROUND ART

Plant materials are utilized on an industrial scale to produce a wide range of products including foods, beverages, alcohol, fertilizers, and animal feed just to name a few. In the production of such goods, it is typical to expose plant material to one or more of a wide range of purification steps so as to remove undesirable components. In addition, concentration steps are sometimes carried out to remove water from a process intermediate to produce other useful products such as concentrated juices.

The process of concentrating liquid solutions containing dissolved solids to very low water content, traditionally involves the use of evaporators. Due to rising costs in electricity, gas and water, this method of concentrating is becoming cost prohibitive for the concentrating industry, despite achieving final water concentration levels of between 10 and 30 percent in the processed liquid solution.

As one example, plant material may be used in the production of alcohol by fermentation. A plant-derived material containing sugar is incubated with yeast, with the yeast metabolically converting the sugar to alcohol. A common use of fermentation is by distilleries that utilize plant sugars such as molasses for the production of alcohol. First, molasses is diluted by adding water to adjust the total dissolved solids to about 7-8% before adding yeast, nitrogen and other required nutrients for fermentation to commence. At the end of this ferment, when glucose is converted to ethyl alcohol and carbon dioxide, the solution is referred to as a beer solution. The $CO_2$ is collected during its production and the alcohol is harvested through a distillation column. The diagrammatic representation of the process can be seen in FIG. 1.

The still bottoms or spent wash from this fermentation process is a complex organic effluent that is characterised as dark brown in colour, acidic and with a high BOD and COD value. The solution is rich in organic carbon, K, Ca, Mg and S and contains N, P, Mn, Fe, Zn, Cu and traces of sugar. It also contains plant growth promoters such as indole acetic acid and gibberellic acid. The solution is not toxic, biodegradable and can be used for the following applications:

1. Composting either by traditional means or through bio-methanation.
2. Potash recovery through incineration of the distillery spent wash after neutralisation with lime.
3. Fertilising soils for crops such as rice, wheat, sugarcane, ground nut, C3 and C4 plants and others. The limitation is the high BOD and COD that can be overcome by diluting with irrigation water during application. The fertiliser can be wet or dry.
4. Biogas production.

Most of the 4000 alcohol distilleries in the world use starch and sugar feedstock up to 20% concentration in water for ethanol yeast fermentation that is heated to boiling in a still to evaporate the volatile fermentation products, mostly azeotropic ethanol, that condense in a column separator and the residuals are discharged as hot still bottoms that can contain from 2-10% inorganic and organic dissolved and suspended solids composed mostly of spent yeast cells and cell parts, metabolites, fermentation by-products, and non-fermentable starch and sugar feedstock residues. Nitrogen is often added to culture yeast before fermentation and typical yeast is composed of nearly 90% protein and carbohydrates.

Following distillation to remove alcohol, this still bottom fraction is often discharged directly to a water course, decanted into heavier and lighter fractions, or is evaporated to recover the solids as animal feed, filtered to recover other fermentation by-products from a concentrate, or biologically treated by anaerobic digestion to recover methane fuels (FIG. 3).

Replacement of evaporators for the production of recycled water from still bottoms suitable for use in alcohol fermentation propagation is taught by Bento et al in U.S. Pat. No. 5,250,182.

Peyton et al in European patent EP 1748835 B1, titled "Method for producing a beverage from fermentation of still bottoms", teaches the recovery of potable water from spent still bottoms using a pressurized membrane filtration process using membranes such as UF (ultrafiltration), NF (nanofiltration) and RO (reverse osmosis) to produce a pure permeate.

Peyton et al emphasises the requirement to maintain pasteurisation of the still bottoms for the production of potable water by processing the still bottoms at a temperature of between 35 and 80 Celsius. The dehydration of still bottoms by RO resulted in a waste with total solids between 20% and 50% that was suitable for subsequent methane fermentation to produce fuel gas.

Heat energy was also recoverable from the RO permeate, reducing its high temperature to 25 Celsius using heat exchangers. The RO membranes used for this process are polyamide for filtering the high temperature, freshly distilled still bottoms.

Peyton et al teach that the preferred total solids concentration of still bottoms was less than 10% w/w in water, more typically 1% to 7%, with a COD concentration from 20,000 to 80,000 ppm. This feed liquid is first filtered by ultrafiltration, a process that removes particles sized between 0.1 and 0.005 microns or molecules having a molecular weight cut off of 10,000 Daltons. This may also include an additional NF membrane prior to RO in order to remove particles of 0.005 and 0.001 microns in size or of 700 Daltons cut-off in size.

These preferred conditions of the still bottoms are necessary to avoid very rapid fouling of the RO or NF membranes. An additional step Peyton et al includes is the requirements of a centrifugal decanter or a course liquid separating device, particularly when the heavy stillage fraction of the still bottoms is presented for dewatering through his process.

Concentrating still bottoms by evaporation is the standard method used in many distilleries across the world to recover water and by-products (FIG. 2). Briefly, multi-effect or other types of industrial evaporators, require the still bottoms to be pre-treated by decanting or centrifugation to remove the majority of the solids. The concentrate produced by evaporation is composed of between 30 and 35% total solids. The most common evaporators being used to concentrate juice or spent wash (ferments with alcohol removed) are the multi-effect evaporators where water is boiled in a sequence of vessels, each held at a lower pressure than the last. Such evaporators, despite being more energy efficient than single evaporators, are still large consumers of energy (power, steam, water, etc.) and are limited in efficiency to a maximum number of seven effects in series. This limitation to the number of effects is due to the cost-benefit analysis of adding additional effects in commercial practice.

Solids removed by decanting may be used as feed stock for animals. The concentrated still bottoms are often further dried using industrial dryers or traditional drying methods to produce soil or agricultural fertilisers (FIG. 2).

The problem of using evaporators in the process of reclaiming water from still bottoms is the requirement of pre-treatment with a decanter or centrifuge to remove most of the solids and high power costs and equipment maintenance (FIG. 3). In a typical scenario, a multi-effect evaporator consumes 90 KWh to process 12,000 L and to concentrate to 3000 L in final volume.

From FIG. 4, it can be seen that FO (forward osmosis) costs can vary with different types of FO membranes used, however the technology is a lot cheaper than evaporation costs, when a specific membrane and conditions are optimised.

Plant materials are also used as a basis for the production of a wide range of beverages and intermediates such as fruit juices, fruit juice concentrates and potable water products. The use of size exclusion filtration for the production of drinking water from fruit, vegetables and sugar cane juice, has been taught by Kambouris in Australian Patent number: 2010101445, titled "Recovering water'. In this prior art, the use of pressure filtration, either reverse osmosis (RO) or nanofiltration (NF), for treating condensate removed from the juice during the evaporative concentration process, followed by carbon polishing, produced potable, storable, clean water that was devoid of sugar residues and low molecular weight aromatic molecules.

Condensate can be obtained using different types of evaporators, such as the centritherm, a single effect or multi-effect evaporator. The condensate can be collected either from either all the effects, or from a combination of effects, or from one effect of a multi-effect evaporator.

It is often seen that the condensate recovered from the first effect of a multi-effect evaporator, or a single evaporator is highly contaminated with source juice. The condensate from the remaining and subsequent effects, are very low in organic material.

If the condensate from effect 1 is mixed with condensate from all the other remaining effects of the same evaporator, it increases the organic load of the condensate considerably. This has bearing on the life of the RO membrane that Kambouris uses to filter condensate to produce potable water.

Condensates derived from evaporators, if treated in real time, are hot. The use of FO and removing heat in the draw liquid prior to regeneration by RO or NF, allows real time generation of potable water. This process eliminates the need for special heat resistant RO membranes although, they may be used if required or preferred.

It is also proposed that further efficiencies in evaporator use can be achieved by options other than increasing the number of effects on any evaporator.

It is an aspect of the present invention to overcome or ameliorate a problem of the prior art. It is a further aspect to provide a useful alternative to the prior art.

The discussion of documents, acts, materials, devices, articles and the like are included in this specification solely for the purpose of providing a context for the present invention. It is not suggested or represented that any or all of these matters formed part of the prior art base or were common general knowledge in the field relevant to the present invention as it existed before the priority date of each provisional claim of this application.

SUMMARY OF THE INVENTION

In a first aspect, but not necessarily the broadest aspect, the present invention provides a method for preparing a plant derived product or a process intermediate or a process input, the method comprising the steps of: providing a plant derived starting material, subjecting the starting material to a forward osmosis step against a draw solution so as to produce a plant material concentrate, and subjecting the draw solution to a water removal step.

In one embodiment of the method of the first aspect, the water removal step is configured to provide a water-rich fraction and a water-poor fraction.

In one embodiment of the first aspect, the method comprises the step of utilizing the water-poor fraction as the draw solution of the forward osmosis step, or a component of the draw solution of the forward osmosis step.

In one embodiment of the method of the first aspect, the forward osmosis step is carried out contemporaneously with the water removal step, and the water poor fraction is conducted to the draw solution of the forward osmosis step.

In one embodiment of the first aspect, the method comprises the step of continuously or semi-continuously conducting the draw solution of the forward osmosis step to the water removal step, and continuously or semi-continuously conducting the water-poor fraction of the water removal step to the draw solution of the forward osmosis step in a cyclic arrangement.

In one embodiment of the method of the first aspect, the cyclic arrangement is substantially closed.

In one embodiment of the method of the first aspect, the water removal step is a reverse osmosis step, or a nanofiltration step, or an ultrafiltration step, or a condensation step, or a membrane distillation step.

In one embodiment of the first aspect, the method comprises the step of collecting the plant material concentrate of the forward osmosis step and optionally subjecting the concentrate to one or more further process steps.

In one embodiment of the method of the first aspect, the collected plant material concentrate of the forward osmosis step is further processed so as to form a fertilizer product.

In one embodiment of the method of the first aspect, the step of further processing comprises one or more of drying, grinding, pelletizing, mixing with a botanically acceptable excipient, and mixing with a functional microbe species.

In one embodiment of the method of the first aspect, the collected plant material concentrate of the forward osmosis step is further processed so as to form an animal food product.

In one embodiment of the method of the first aspect, the step of further processing comprises one or more of drying, grinding, pelletizing, and mixing with a nutritionally acceptable excipient.

In one embodiment of the method of the first aspect, the method comprises the step of collecting the water-rich fraction of the water removal step and optionally subjecting the concentrate to one or more further process steps.

In one embodiment of the method of the first aspect, the collected water-rich faction of the water removal step is utilized as process water in the method, or in a second method.

In one embodiment of the method of the first aspect, the collected water-rich fraction of the water removal step is further processed so as to form a beverage product.

In one embodiment of the method of the first aspect, the step of further processing comprises one or more of a solute removal step, a microbe removal step, a microbiocidal step, mixing with a supplemental agent, and bottling.

In one embodiment of the method of the first aspect, the solute removal step comprises an adsorption step.

In one embodiment of the method of the first aspect, the adsorption step is an activated carbon step or a zeolite step.

In one embodiment of the method of the first aspect, the plant derived starting material is a crushed or liquefied extract of a plant material.

In one embodiment of the method of the first aspect, the plant derived starting material is a by-product or process intermediate of an industrial process.

In one embodiment of the method of the first aspect, the plant derived starting material is a condensate or a permeate of a plant juice concentration process.

In one embodiment of the method of the first aspect, the plant derived starting material is a still bottom of a fermentation process that utilizes a plant feedstock.

In a second aspect, the present invention provides a fertilizer product produced by a method according to any embodiment of the first aspect.

In a third aspect, the present invention provides an animal feed product produced by a method according to any embodiment of the first aspect.

In a fourth aspect, the present invention provides a potable beverage product produced by a method according to any embodiment of the first aspect.

In a fifth aspect, the present invention provides a process intermediate produced by a method according to any embodiment of the first aspect.

In a sixth aspect, the present invention provides a system for preparing a plant derived product or a process intermediate or a process input, the system comprising a forward osmosis apparatus comprising a draw solution retaining portion, and a water removal apparatus comprising a water-poor fraction containing portion, wherein the draw solution retaining portion is in fluid communication with the water-poor fraction containing portion.

In one embodiment of the sixth aspect, the system is configured such that (i) a draw solution of the draw solution retaining portion of the forward osmosis apparatus is conducted to the water-poor fraction retaining portion of the water removal apparatus, and (ii) a water-poor fraction retaining portion of the water removal apparatus is conducted to the draw solution retaining portion of the forward osmosis apparatus.

In one embodiment of the sixth aspect, the system is configured such that the draw solution and water-poor fraction are conducted in a cyclic arrangement.

In one embodiment of the sixth aspect, the system comprises pumping means configured to conduct the draw solution and water-poor fraction are conducted in the cyclic arrangement.

In one embodiment of the sixth aspect, the system comprises a closed circuit configured to (i) a draw solution of the draw solution retaining portion of the forward osmosis apparatus is conducted to the water-poor fraction retaining portion of the water removal apparatus, and (ii) a water-poor fraction retaining portion of the water removal apparatus is conducted to the draw solution retaining portion of the forward osmosis apparatus In one embodiment of the sixth aspect, the water removal apparatus is a reverse osmosis apparatus, or a nanofiltration apparatus, or an ultrafiltration apparatus, or a condensation apparatus, or a membrane distillation apparatus.

In one embodiment of the sixth aspect, the system comprises solute removal apparatus in fluid communication with the water-poor fraction containing portion of the water removal apparatus In one embodiment of the sixth aspect, the solute removal apparatus operates on the basis of solute adsorption.

In one embodiment of the sixth aspect, the solute removal apparatus comprises an activated carbon or a zeolite.

In a seventh aspect the invention comprises a method for concentrating juice or spent wash the method including the steps of:
(a) providing a juice for concentration;
(b) subjecting the juice to a forward osmosis step to remove water from the juice and provide concentrated juice;
(c) subjecting the concentrated juice to an evaporation process to remove yet more water.

In preference the evaporation process includes single or multiple evaporators in series.

In a further aspect of the invention there is proposed a system for producing concentrated juice the system comprising:
a forward osmosis apparatus to remove a percentage of water from the juice to produce concentrated juice;
at least one evaporation apparatus adapted to receive the concentrated juice and remove yet more water from the concentrated juice.

In preference the juice is sugar cane juice or sugar beet juice or distillery spent wash.

DETAILED DESCRIPTION

Figure 1:
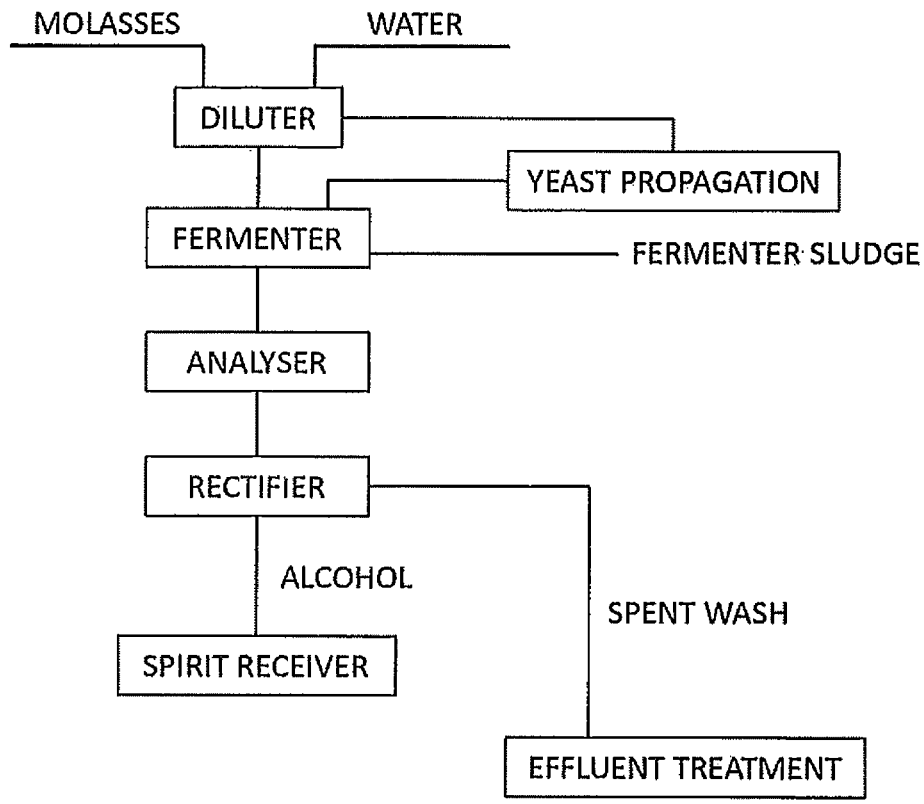
FIG. 1 is a diagram of the alcohol production process by fermentation.

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention. Furthermore, statements of advantages or other aspects apply to specific exemplary embodiments, and not necessarily to all embodiments covered by the claims.

Unless the contrary intention is expressed, the features presented as preferred or alternative forms of the invention can be present in any of the inventions disclosed as alone or in any combination with each other.

Throughout the description and the claims of this specification the word "comprise" and variations of the word, such as "comprising" and "comprises" is not intended to exclude other additives, components, integers or steps.

It is not represented that any embodiment of the present invention has all advantages disclosed herein. Some embodiments may provide no advantage and represent only a useful alternative to the prior art.

One embodiment of the present invention provides a method for recovering potable water and solid nutrients from the remaining still bottoms or spent wash that have been distilled to remove alcohol (spent bottoms) after a sugar fermentation. The present invention is applicable to alcohol distillation plants that utilise plant derived fermentable sugars, cellulose-based materials and cellulosic biomass as the substrate for microbial fermentation to produce alcohol.

The method may provide reclaimed potable water that is suitable for reuse in new ferments, or to be used as factory operations water or even drinking water. The highly nutritional solids remaining after water removal by this process can be used as liquid fertilisers or further dehydrated by either industrial driers or by natural heat or weather, to produce animal feed or agricultural fertilisers.

Prior to drying the still bottoms completely, there is the option of further fermentation to produce methane gas for fuel use, prior to use of the residues as liquefied solids as fertiliser for agricultural use.

The present invention provides for the use of forward osmosis in the dehydration of still bottoms, to produce a potable water and wet solid rich fraction. The forward osmosis (FO) draw solution can be selected from an array of potential options such as, but not limited to sodium chloride (NaCl), magnesium chloride (MgCl2), small inorganic and thermolytic salts. The preferred draw solution is sodium chloride. These solutes may be used to commence operation of the RO, and may be augmented as processing continues by the build-up of solutes entering the system by way of input material and being retained in the water-poor fraction of the water removal step.

The Forward osmosis (FO) step is an osmotic process that, like reverse osmosis, uses a semi-permeable membrane to effect separation of water from dissolved solutes. The driving force for FO separation is an osmotic pressure gradient created using a "draw" solution of high concentration. This osmotic gradient is used to induce a net flow of water through the membrane into the draw solution, thus effectively separating the feed water from its solutes.

Figure 2:
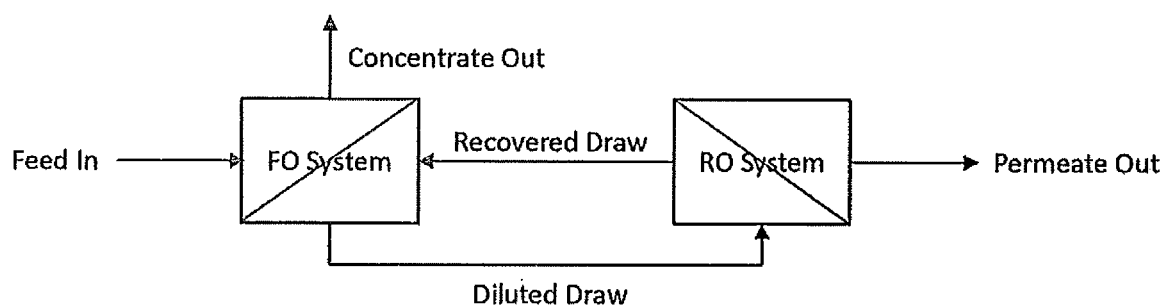
FIG. 2 is a diagram of the forward osmosis and recovery of the draw solution according to a preferred embodiment of the present invention.
Figure 3:
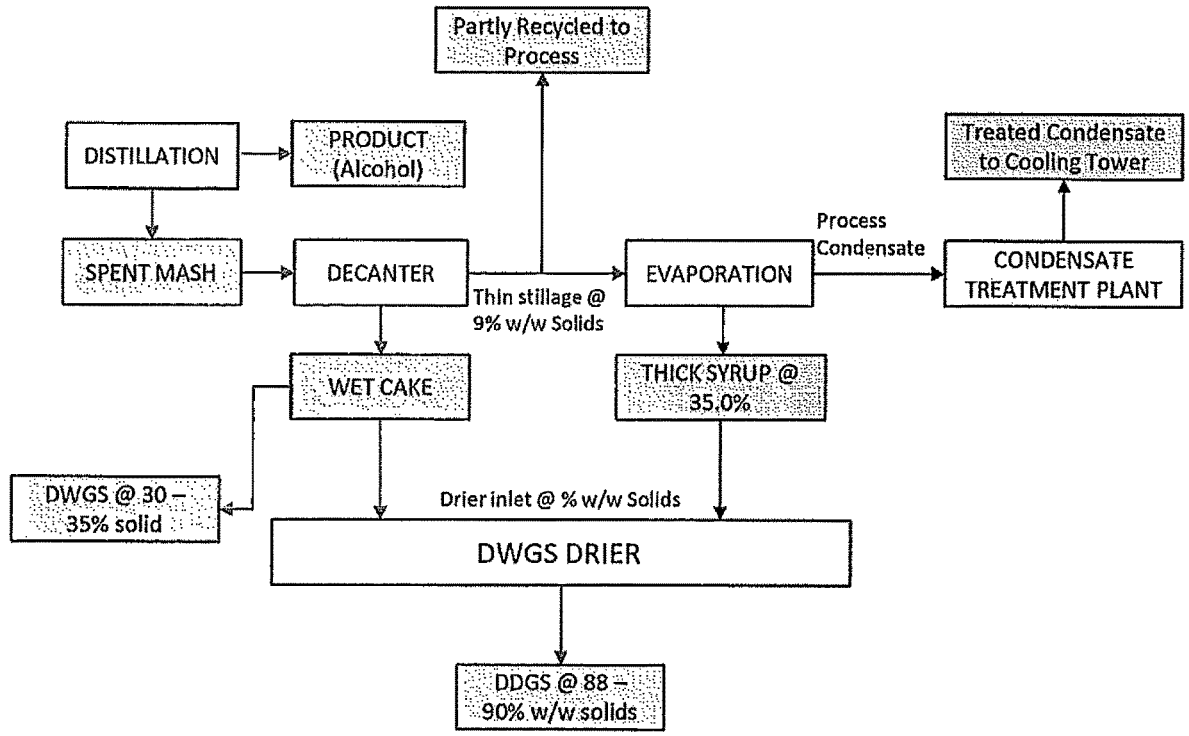
FIG. 3 is a flow diagram of spent still bottoms processing post removal of alcohol by distillation.

The schematic process in FIG. 2 shows the feed liquid (still bottoms) passing through the FO unit. A FO membrane allows interfacing between the feed solution and the draw solution. This figure also shows draw liquid being regenerated using RO to remove clean water as permeate.

The RO water permeate is clean water that may contains only trace amounts of nutrients or residues. This water is directly suitable for use in new ferments, as operations water. If permeate is required for human consumption, it requires contact with activated carbon (such as granular activated carbon; GAC; or powdered carbon either of which may be biologically activated) to remove traces of aromatic and volatile low molecular weight compounds that may passage through the RO molecular weight cutoff point. This water with further treatment such as filtration to remove traces of activated carbon and sterilization or disinfection, will be suitable for human consumption or be potable. It can be used as a source of bottling water.

It is preferred to use low solids and pectin clarified juice processed under an inert gas atmosphere at the natural pH of the juice, and in low light exposure to reduce nutritional oxidation and decay. Sterilisation is preferable carried out by either high pressure sterilisation, UV sterilization or the use of Dimethyl Dicarbonate (DMDC) or other methods that preserve the activity of any nutrient constituents A zeolite may be used as an alternative to activated carbon. Zeolites are aluminosilicate members of the family of microporous solids, with more common members being analcime, chabazite, clinoptilolite, heulandite, natrolite, phillipsite, and stilbite. Such natural or man-made zeolites can be used to capture and remove molecules on the basis of having pore size greater than the molecular diameter of the molecule to be removed and furthermore, be suitably either hydrophobic or hydrophilic. An example mineral formula is: $Na_2Al_2Si_3O_{10} \cdot 2H_2O$, the formula for natrolite.

Another polishing step can include the use of AmberChrom CG-161 to further process the filtration permeate. The AmberChrom resin may be incorporated for the purpose of reducing residual sugar levels to reduce the residual sugar. Detailed application notes for the AmberChrom CG-161 resin may be obtained from Rohn and Haas Company, Philadelphia USA. Functionally equivalent resins are also included within the scope of the present methods. AmberChrom CG-161 may be used to remove aroma and sugar to make the water more neutral in aroma and taste.

The plant-based starting material for the present methods can be a mechanically prepared juice or crush of a plant. Alternatively, the starting material may be a process intermediate of a separate process. For example, the liquid fraction that remains after fruit or vegetable or sugar cane juices have been concentrated commercially is referred to as LSJ (low sugar juice). The processes that produce concentrate and hence LSJ are several including evaporation, filtration (Reverse Osmosis) and freeze concentration.

It will be appreciated that in many circumstances, some pre-treatment of the plant material will be required. Otherwise blockage occurs. For example, processes such as cross-flow filtration or ultrafiltration will be useful. Accordingly, in some embodiments the method comprises the step of pre-treatment.

It will be appreciated that based on the present disclosure, the skilled person could prepare beverages from one (or even a mixture) of the following plants: fruits including orange, apple, tomato, grape, pineapple, mango, berries; coconut milk; sugar cane and the like; vegetables including carrot, celery, beet, pumpkin, and turnip and the like.

In a second aspect the present invention further provides a plant-derived beverage product or process intermediate thereof produced according to a method described herein.

In one embodiment, the product of the present methods has any one or more of the following characteristics:

Aroma/odour constituents of more than odour #3A and/or over the threshold odour acceptable for drinking water;

Apparent colour or absorbance of more than the sum of the spectrophotometric absorbance at 420 nm and 520 nm of laboratory grade reverse osmosis water when measured through a quartz cuvette having a pathlength of 1 cm;

More than about 0.1 Bx sugar, or more than about 0.005 Bx sugar; and/or less than the amount of sugar in an untreated juice.

Noticeable taste over and above that of comparable to potable drinking water

More than about 50 ppm total dissolved solids (TDS);

More than about 600 ppm total organic carbon (TOC); and

Turbidity more than about 0.5, preferably more than about 0.5 NTU.

In another embodiment, the product of the present methods is very similar to pure water and has any one or more of the following characteristics:

Aroma/odour constituents of less than odour #3A and/or under the threshold odour acceptable for drinking water;

Apparent colour or absorbance of more than the sum of the spectrophotometric absorbance at 420 nm and 520 nm of laboratory grade reverse osmosis water when measured through a quartz cuvette having a pathlength of 1 cm;

Less than about 0.1 Bx sugar, or less than about 0.005 Bx sugar; and/or less than the amount of sugar in an untreated juice.

No noticeable taste over and above that of comparable to potable drinking water

Less than about 50 ppm total dissolved solids (TDS);

Less than about 600 ppm total organic carbon (TOC); and

Turbidity less than about 0.5, preferably less than about 0.5 NTU.

Preferably, the beverage defined above is produced from filter concentrated low sugar juice residues. The low sugar juice may be provided by evaporation, filtration or freeze concentrating. In one embodiment, the process used to produce this embodiment comprises the steps of filtration between about >100 and about <180 Daltons to produce a substantially sugar free water.

The draw solution passing through the FO needs to be regenerated and this can occur through the removal of pure water and leaving the salts behind. Water removal from the draw solution can be achieved by reverse osmosis, nanofiltration, distillation, or by any other means that allows this to happen.

Advantages in using FO rather than RO is the fact that FO membranes do not foul as readily as RO membranes when in direct contact with still bottoms which contain very high levels of organic material and suspended solids. This is due to the fact that particles are likely to be pushed into the pores of RO membranes due to the high pressure exerted on the liquid during filtration.

In contrast, FO membranes are resistant to fouling because there is much less physical pressure on the liquid during FO filtration and suspended solids seldom enter pores of the membrane. Reversed flushing with clean water on a daily basis, often clean the pores of the membrane more successfully than with RO. Thus, using FO will result in consistent water flux from the still bottoms, resulting in drier feed waste. Drier waste, will require less energy to completely dehydrate.

FO membranes are functional within the temperature range of 1 to 95 Celsius and are highly resistant to high chemical concentrations and extreme ph. Still bottoms temperatures often aim to reach around 80 Celsius during ethanol distillation due to the lower boiling point of ethanol relative to water.

Heat energy from the still bottoms can be harvested from the draw solution post FO filtration and prior to draw solution regeneration. The energy in reducing the temperature from around 80 Celsius to 25 Celsius, can be harvested using heat exchangers such as tube in tube type or other types. This eliminates the requirements for expensive heat resistant RO membranes. The heat harvested can then be used where required to offset the cost of running the FO and RO system.

Unlike RO that requires the raw still bottoms to be decanted, ultra-filtered and nano-filtered as a pre-treatment to prevent membrane fouling, the FO membrane only requires either a course screen or a sand filter to function under these highly fouling conditions.

The use of membrane distillation as is evaporation using an evaporator such as the multi-effect or other type is suitable for regenerating the draw solution required for the FO.

Membrane distillation is a thermally driven separation program in which separation is enabled due to phase change. A hydrophobic membrane displays a barrier for the liquid phase, allowing the vapour phase pass through the membrane's pores. The driving force of the process is given by a partial vapour pressure difference commonly triggered by a temperature difference.

To the best of Applicant's knowledge, the prior art fails to teach application of this FO technology that teaches the recovery of water from spent still bottoms after alcohol distillation. The use of FO replaces the existing complex pre-treatments necessary for processing still bottoms by RO for potable water recovery. The remaining still bottom or spent wash fraction after dehydration by FO and RO combined, contains at least and more than 50% total solids, resulting in more water recovery and a waste fraction that requires less energy to dehydrated further if required to produce solid fertiliser.

This waste fraction in the liquid state can be used as a liquid fertiliser or substrate for methane fermentation. The liquid or solid fertiliser can be combined with other ingredients or functional microbes of any type, such as nitrogen fixing bacteria. These microbes can even be microencapsulated to preserve the microbe activity within the fertiliser. Microbes such as the example given will convert atmospheric nitrogen into plant usable nitrogen. Optimising such fertilisers with known nutrients is also the scope of this invention.

Such fertilisers will aim to increase soil fertility with nutrients found in the still bottoms. The additional fortification with microorganisms along with the still bottom solids, will allow propagation of microorganisms into the soils it is spread on or irrigated on.

The present invention provides a simplified process for utilising the remaining still bottoms that have been distilled to remove alcohol (spent bottoms). The process results in reclaimed drinkable potable water that is suitable for use in new ferments, or as factory operations water. The remaining solids after this process can be used as liquid feed stock or liquid fertiliser or, dehydrated by industrial driers to produce dry animal feed or agricultural fertilisers.

Water and fertiliser or animal feed product produced from processing spent bottoms with the technology described in this invention, can reduce the amount of externally sourced operations water and give the factory an additional saleable fertiliser product.

The technology reduces the requirements for decanting and high energy evaporation and collectively, reduces power consumption enormously. The heat recovered from the still bottoms further reduces the cost of operations and if required, the wet solid residues can be further fermented to produce methane fuel before being dried to make agricultural fertilisers.

The advantages of using low fouling Forward Osmosis (FO) prior to RO filtration, is to maintain high flux of dewatering and eliminate further pre-treatment such as decanting, UF and NF, all of which are expensive and complex processes and add to cost of production.

The total solids achievable in still bottoms after FO pre-treatment to RO or NF is at least 50% and more.

The present invention provides in some embodiment a beverage suitable for human consumption. It is proposed that without additional GAC treatment proposed herein, to remove left over organic residues, the water will not be palatable or taste appropriate for human consumption. Furthermore, the water will foul chemically and microbiologically and cannot be stored if not treated with GAC under water storage conditions.

The present invention may utilize a RO or NF as the water removal step. Glucose and fructose can be concentrated by removing most of the water, minerals, ascorbic acid and volatile aromatic and flavour compounds using further filtration via RO. Since MWCO of NF and RO membranes often overlap, either membrane can be used for this step. The MWCO could be any size, but is preferably less than that of the glucose and fructose (MW about 180 Daltons), to retain these sugars from entering the permeate. Reference is made to "The Filtration Spectrum", Osmonics, Inc., Minnetonka, MN, copyright 1990, 1984.

The permeate, although generally pure, contains low molecular weight aromatics from the source juice and gives the water an aroma and taste, that causes it to differ to the experience of drinking pure water. Furthermore, untreated, the organic load of below 100 Dalton, will sustain microbial growth and water spoilage if stored under conditions used to store drinking water. The use of GAC has not been taught in relation to permeate removed from juices using FO/RO/NF filtration.

It is the purpose of this invention to teach a process of producing operations water and potable water from vegetables, fruit or sugarcane. The process firstly involves producing juice. The juice is then concentrated by any process such as the use of evaporators or part of an evaporator (multi-effect), to remove moisture from the juice. This moisture is recovered as condensate and it is then further processed by Forward Osmosis (FO), Reverse Osmosis (RO) or NF and finally GAC. The resultant water is clean from odour, taste and is suitable for human consumption (potable) and can be used as operations water or be bottled or packaged for sale or human use.

The present invention is distinguished from the prior art document Bento et al teaches the use of thin stillage fraction rather than unprocessed still bottoms for water production. Thus, his process requires prior pre-treatment of still bottoms to removal most solids with either filtration or decanting, centrifugation or gravity.

Bento et al teaches using a plurality of membranes to recover lactic acid and glycerol from corn using the thin stillage of still bottoms. This invention also teaches the production of water through pressurised filtration, which is mineral free and suitable for use in boilers and in ethanol fermentations. This patent does not teach the use of this water for human consumption. In this patent, we are taught that pre-treatment of Still bottoms is essential to prevent fouling of the pressurised RO membrane used. The pre-treatment of raw still bottoms prior to RO filtration includes decanting, UF and NF in series. FO is not considered in replacing these listed pre-treatments prior to RO as a means of preventing fouling.

Kambouris does not teach of removing this first, most contaminated effect prior to treating the condensate by RO filtration or, treating it separately to prevent RO fouling.

One scope of the present invention is to teach the use of FO as a pre-treatment to either RO or NF, or membrane distillation, or other distillation, which is then followed by GAC. This modification to the teachings of Kambouris, effectively allows the first effect of the evaporator to be treated separately, or alternatively, combined with the cleaner effects of the same evaporator, whilst keeping the risk of fouling the RO or NF membrane low. Treating the first effect without discarding it, allows for the recovery of a substantial additional amount of water without causing fouling.

While Peyton discusses the derivation of a water from still bottoms, there is no disclosure whatsoever to the use of FO, let alone in the context of prevention of fouling of other membranes or the further concentration of still bottoms or for the production of a beverage.

The present invention may in some embodiments be considered to provide a synergism in that the combination of the FO and water-removal step in combination provides an unexpected outcome that is more than the additive effects of each component separately. For example, the combination provides the benefits of (i) a means to concentrate a still bottom or beverage concentrate or beverage permeate (such as low sugar juice) (ii) means to improve removal of water form still bottoms so to provide a drier residue (ii) means to provide both a potable beverage and a fertilizer from a still bottom, and (iii) means to reduce fouling of membranes such as RO membranes thereby lessening the need for regeneration or replacement.

A further scope of the present invention is for a process and apparatus for the concentration of juices in particular sugar juice or sugar beet juice or spent wash (ferments with alcohol removed) using Forward osmosis as a pre-evaporator concentration step. The Forward osmosis (FO) step is an osmotic process that, like reverse osmosis, uses a semi-permeable membrane to effect separation of water from dissolved solutes. The driving force for FO separation is an osmotic pressure gradient created using a "draw" solution of high concentration. This osmotic gradient is used to induce a net flow of water through the membrane into the draw solution, thus effectively separating the feed water from its solutes.

The FO technology has not been used in series with an evaporator especially in the sugar and sugar-beet and spent wash concentration industry. It can also be used in the processing of milk and whey.

The FO concentration step proposed may concentrate juices from their physiologically acquired Brix at maturity to a final 40 or 50 Brix. This FO concentration process alone, is not useful for sugar juice or beet juice processing, that aims to produce raw crystalline sugar or molasses and requires much less water in the concentrate for further processing to make the crystallisation process economically achievable. Multi-effect evaporators however on their own, can concentrate such juices to desirable higher Brix levels i.e. 70 to 85 Brix.

Figure 4:
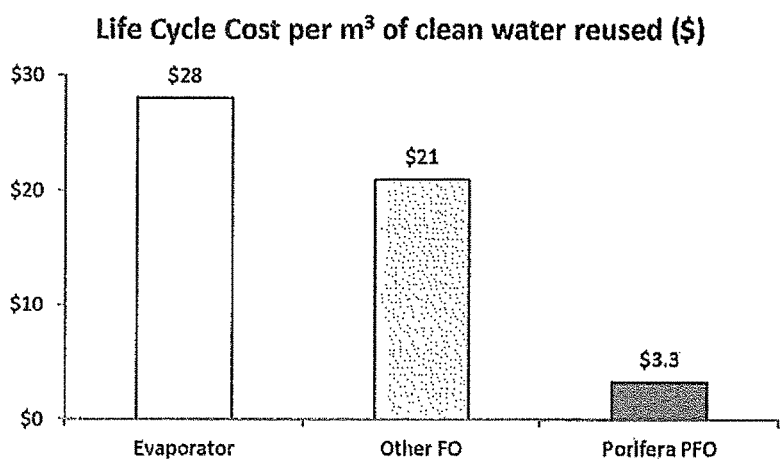
FIG. 4 is a graph showing life cycle cost comparison of using evaporator or forward osmosis technology per 1000 L water produced.

The advantage of FO concentration includes the lower cost of the equipment and the running costs during operation. These costs have been compared in the literature as being in the order of 9 times cheaper than an evaporator (FIG. 4). It is thus environmentally sustainable and economical to include a pre-concentration step that will achieve an initial concentration of the juices or spent wash at a low operating cost prior to the use of an evaporator or a multi-effect evaporator that will then augment the concentration process to achieve the desired 70 to 85 Brix.

There are several advantages in using FO technology prior to evaporator use in series with an evaporator. These include:
(a) The evaporator has less volume to evaporate and could be sized down.
(b) The number of effects can be reduced as less surface area is required.
(c) The flow rate through existing evaporators can be increased due to lower water removal requirements.
(d) Reduced energy, steam, gas water requirements during processing fixed volume liquids.

The evaporator is a piece of equipment that is used to convert a liquid substance such as water into its gaseous-form. The liquid water is evaporated, or vaporised, into a gas form in that process. The vaporised water is then condensed and collected as a liquid again.

Briefly, the evaporators are fed a solution requiring concentrating across a heat source, converting the water in the feed into vapour. The vapour is removed from the rest of the solution and is condensed while the now-concentrated solution is either fed into a second evaporator or is removed.

An evaporator may consist of four sections. These are: firstly, the heating medium, which is often steam that passes through parallel conducting tubes or plates or coils. Secondly, a concentrating and separating section which removes the vapour being produced from the feed solution. Thirdly, a condenser that condenses the separated vapour. Finally, a vacuum system or pump to increase circulation and reducing the pressure within the evaporator and reducing the boiling point of the water.

There are many different types of evaporators in use. These include: natural/forced circulation evaporators, falling film evaporators, rising film (long tube vertical) evaporators, climbing and falling film plate evaporators, multi-effect evaporators and agitated thin film evaporators and others not mentioned.

The most commonly used evaporator type used in sugar cane juice concentration, sugar beet juice concentration and alcohol distillation spent wash concentration, are the multi-effect evaporators.

These multi-effect evaporators unlike single-stage evaporators, can be made of up to seven evaporator stages or effects. The reason for using multiple effects during evaporation is because energy consumption for single-effect evaporators is very high and is most of the cost for an evaporation system.

Multiple effects combined saves heat and energy. In fact, a dual effect evaporator can reduce energy consumption of one single evaporator by 50%. Adding to this another effect can reduce energy consumption to 33% and so on until seven effects are in parallel and no further savings can be obtained due to the actual cost of each effect. The energy saving can be calculated.

Feeding liquid into the multiple-effect evaporators can be either by the forward or backward feeding approach.

The forward feeding approach means that feed liquid enters the system through the first effect, which is at the highest temperature. This feed liquid is then partially concentrated as some water is removed before being fed into the lower temperature second effect and so on. The second effect is heated by the vapour removed from the first effect (hence the saving in energy expenditure). This continues throughout the effects in series and the combination of lower temperatures and higher viscosities in subsequent effects provides an increase in the heating surface area.

In contrast, in backward feeding, the last effect has the lowest temperature and is fed the liquid being concentrated and the liquid moves effects whilst the temperature in these effects increases. The final concentrate is collected in the hottest effect, which provides an advantage in that the product is highly viscous in the last stages, and so the heat transfer is better.

The schematic process in FIG. 2 shows the feed liquid (still bottoms) passing through the FO unit. A FO membrane allows interfacing between the feed solution and the draw solution.

The draw solution passing through the FO needs to be regenerated and this can occur through the removal of pure water and leaving the salts behind. Water removal from the draw solution can be achieved by reverse osmosis, nano-filtration, membrane distillation, or by any other means that allows this to happen.

Advantages in using FO rather than RO is the fact that FO membranes do not foul as readily as RO membranes when in direct contact with spent wash or juice which contain very high levels of organic material and suspended solids. This is because particles are likely to be pushed into the pores of RO membranes due to the high pressure exerted on the liquid during filtration.

In contrast, FO membranes are resistant to fouling because there is much less physical pressure on the liquid during FO filtration and suspended solids seldom enter pores of the membrane. Reversed flushing with clean water daily, often clean the pores of the membrane more successfully than with RO. Thus, using FO will result in consistent water flux from the spent wash or juice, resulting in drier solution entering the evaporator. Drier solutions will require less energy to completely dehydrate.

FO membranes are functional within the temperature range of 1 to 95 Celsius and are highly resistant to high chemical concentrations and extreme ph. Spent wash temperatures often aim to reach around 80 Celsius during ethanol distillation due to the lower boiling point of ethanol relative to water.

Heat energy from the spent wash can be harvested and added to the draw solution post FO filtration and prior to draw solution regeneration when using membrane distillation. The energy in reducing the temperature from around 80 Celsius to 25 Celsius, can be harvested using heat exchangers such as tube in tube type or other types. This eliminates the requirements for expensive heat resistant RO or NF membranes if these are required. The heat harvested can then be used where required to offset the cost of running the FO and RO system. Alternatively, heat harvested from the evaporator condensates can be used to heat the draw solution prior if membrane distillation is the preferred draw solution regenerative process.

Membrane distillation is a thermally driven separation program in which separation is enabled due to phase change. A hydrophobic membrane displays a barrier for the liquid phase, allowing the vapour phase to pass through the membrane's pores. The driving force of the process is given by a partial vapour pressure difference commonly triggered by a temperature difference.

Unlike RO that requires the spent wash to be decanted, ultra-filtered or Nano-filtered as a pre-treatment to prevent membrane fouling, the FO membrane only requires either a course screen or a sand filter to function under these highly fouling conditions.

The invention can be described as a new option other than adding effects to an existing single evaporator or, a multi-effect evaporator that already has the maximum number of effects or efficiency and is energy use expensive.

Adding FO in series prior to existing evaporators to pre-concentrate, reduces the overall processing costs and capital costs of expanding evaporators. This leads to a reduction in the use of power, steam, water and heating for concentrating a given volume of juice or liquid solution.

The invention requires the use of Forward Osmosis filtration technology to pre-concentrate or de-water the juice to a mid-level of concentration, prior to concentrating the juice to the final desired level using an evaporator.

Sugar cane juice commercially extracted from sugar cane at maturity after the addition of chemicals and clarified is around 13 Brix. Within the evaporator, the juice is recirculated until the final Brix departing the evaporator increases to between 70 to 75 Brix.

A sugar juice concentration process was carried out. The amount of sugar cane juice processed by evaporation was 325 tonnes per hour through a multi-effect evaporator. The juice contained 87% water and for every 5.18 tonnes of water removed from the juice through the evaporator, 1 tonne of steam was consumed.

Using FO to reduce the water contents of the sugar juice by only 26% in a sugar mill that crushes 7,000 tones sugarcane per day, saved the use of 400 tonnes per day steam by a 5-effect evaporator and about 175 tonnes/day bagasse.

Plant materials are utilized on an industrial scale to produce a wide range of products including alcohol. A plant-derived material containing sugar is incubated with yeast, with the yeast metabolically converting the sugar to alcohol. A common use of fermentation is by distilleries that utilize plant sugars such as molasses to produce alcohol. First, molasses is diluted by adding water to adjust the total dissolved solids to about 7-8% before adding yeast, nitrogen and other required nutrients for fermentation to commence. At the end of this ferment, when glucose is converted to ethyl alcohol and carbon dioxide, the solution is referred to as a beer solution. The $CO_2$ is collected during its production and the alcohol is harvested through a distillation column. The diagrammatic representation of the process can be seen in FIG. 2.

As with sugar juice and sugar-beet juice concentration, the aim of concentrating spent wash is to reduce the amount of water in the effluent spent wash as much as possible and as cheaply as possible. The water removed from the spent wash by either the evaporator or FO unit should be of the quality for operations or even potable water standards. Others have already described this source of water for use as operations and potable water suitable for drinking and boiler and solvent and cooling tower use.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

The invention claimed is:

1. A method for solid and water recovery from pre-processed plant waste material, comprising the following steps:
   subjecting the pre-processed plant waste material through a forward osmosis system against a draw solution to produce a dilute draw solution and a wet solid rich fraction;
   wherein the wet solid rich fraction is further used as organic matter;
   processing the dilute draw solution through a reverse osmosis system to produce clean water and a recharged draw solution;
   subjecting the clean water to a filter to produce potable water;
   returning the recharged draw solution back to a forward osmosis filter; and
   wherein heat energy from the pre-processed plant waste material is captured from the forward osmosis step.

2. The method of claim 1, wherein the wet solid rich fraction is used for food products for animals.

3. The method of claim 1, wherein the wet solid rich fraction is used for fermentation.

4. The method of claim 1, wherein the wet solid rich fraction is used for fertiliser.

5. The method of claim 1, wherein the physical filter is either a sand filter, a nanofilter, an ultrafiltration filter, an activated carbon filter and/or a zeolite filter.

6. The method of claim 1, further comprising a polishing step wherein the clean water is further treated with a chromatography resin to remove residual sugars.

7. The method of claim 1, wherein the pre-processed plant material is obtained from a fermentation process.

8. The method of claim 2, wherein the step of further processing comprises one or more of drying, grinding, pelletizing, and mixing with a nutritionally acceptable excipient.

9. The method of claim 1, wherein the clean water is treated further to one or more of the following steps: a solute removal step, a microbe removal step, a microbicidal step, a step of mixing with a supplemental agent, and a bottling step.

10. The method of claim 1, wherein the clean water is used for non-potable water operations.

* * * * *